(12) United States Patent
Loil

(10) Patent No.: US 6,498,651 B1
(45) Date of Patent: Dec. 24, 2002

(54) DEVICE FOR DETECTING ACTIVATION MOVEMENT FOR LASER GYROSCOPE

(75) Inventor: Eric Loil, Chatellerault (FR)

(73) Assignee: Thomson-CSF Sextant, Velizy Villacoublay (FR)

( * ) Notice: Subject to any disclaimer, the term of this patent is extended or adjusted under 35 U.S.C. 154(b) by 0 days.

(21) Appl. No.: 09/647,936

(22) PCT Filed: Feb. 18, 1999

(86) PCT No.: PCT/FR00/00416

§ 371 (c)(1),
(2), (4) Date: Oct. 18, 2000

(87) PCT Pub. No.: WO00/49368

PCT Pub. Date: Aug. 24, 2000

(30) Foreign Application Priority Data

Feb. 19, 1999 (FR) ............................................. 99 02106

(51) Int. Cl.$^7$ ............................................... G01C 19/70
(52) U.S. Cl. .................... 356/476; 356/474; 310/331
(58) Field of Search ................. 356/459, 472, 356/474, 475, 476; 310/319, 328, 331

(56) References Cited

U.S. PATENT DOCUMENTS

| | | | |
|---|---|---|---|
| 4,406,965 A | * 9/1983 | Ljung | 356/476 |
| 4,751,418 A | * 6/1988 | Murase | 310/319 |
| 4,856,901 A | * 8/1989 | Ferriss et al. | 356/476 |
| 4,988,908 A | * 1/1991 | Langton | 356/476 |

* cited by examiner

Primary Examiner—Samuel A. Turner
(74) Attorney, Agent, or Firm—Oblon, Spivak, McClelland, Maier & Neustadt, P.C.

(57) ABSTRACT

An actuating motion detection device for a mechanically actuated gyrolaser including at least one fastening ring coaxial with an actuation axis of the gyrolaser. The fastening ring includes a hub held at a center of a rim by radial flexible strips distributed about the hub, and the radial flexible strips are configured to act as springs and to vibrate under an actuating motion. The motion detecting device includes torsion detectors having a pair of piezoelectric plates disposed at a radial position along one radial flexible strip. The piezoelectric plates have respective remanent magnetic fields aligned in opposite directions, and each piezoelectric plate has two electrodes positioned on opposite sides of the piezoelectric plate with one of the two electrodes contacting the radial flexible strip. The electrodes are connected to a common output. In response to deformations of the flexible strips due to rotational motions along the actuation axis, the torsion detectors generate electrical signals of a same polarity that collect at the common output. In response to deformations of the flexible strips coming from motions not along the actuation axis, the torsion detectors generate electrical signals that cancel at the common output.

5 Claims, 2 Drawing Sheets

DEVICE FOR DETECTING ACTIVATION MOVEMENT FOR LASER GYROSCOPE

BACKGROUND OF THE INVENTION

1. Field of the Invention

The present invention relates to mechanically actuated laser gyrometers used in certain inertial units to measure rotational speeds.

2. Discussion of Background

The principle of a single-axis laser gyrometer is based on the use of two monochromatic light beams that are propagated in opposite directions in a plane along one and the same closed-loop pathway. When the plane of the pathway of the two counter-propagating monochromatic light beams is animated by a motion that is rotational with respect to its axis, the effective lengths of the pathways travelled by the two beams change, giving rise to a difference in frequency between the two beams since the oscillation frequency of a laser is dependent on the length of the path travelled by its beam. This difference in frequency, which can be measured by obtaining the interference of the two beams in a photodetector, then gives a measurement of the speed of rotation of the plane of the pathway of the two light beams about its axis which is the sensitive axis of the gyrometer. However, when the difference in pathways between the two beams is small, the two light beams tend to get coupled and oscillate at one and the same frequency, so much so that it is difficult to measure low rotational speeds. To overcome this lack of sensitivity of single-axis laser gyrometers to low rotational speeds, there are known ways of giving them a mechanical vibrational motion of oscillation about their sensitive axis in order to increase their apparent rotational speed and enable the measurement of the low rotational speeds. This mechanical oscillatory motion is called actuation. The shift that occurs in the rotation measurement given by the gyrometer is subsequently eliminated by appropriate processing when the gyrometer signal is exploited.

The mechanical vibrational actuating motion is generally obtained by mounting a single-axis laser gyrometer in a hollow cylindrical jacket using two fastening rings that are coaxial with its sensitive axis and have a certain degree of flexibility in rotational torsion. These fastening rings are fixed by their hub or inner periphery to the body of the gyrometer and by their rim or outer periphery to the hollow cylindrical jacket which is itself mounted in a casing by means of several elastic shock absorbers evenly distributed on its edge. One of the fastening rings is fitted out with a piezoelectric oscillatory motor used to generate and sustain the actuating oscillations.

Triaxial laser gyrometers are constituted by a rigid assembly of three single-axis laser gyrometers having their sensitive axes oriented along the three axes of a trirectangular trihedron and, as the case may be, by common elements. To remedy their lack of sensitivity to low rotational speeds, they are actuated by a single oscillatory vibrational motion about an axis that is oriented differently from their sensitive axes in a direction such that this motion has same-amplitude components of oscillation about the three sensitive axes of the three single-axis laser gyrometers. To obtain this actuating motion, the three single-axis laser gyrometers constituting a triaxial laser gyrometer unit are mounted, like a single-axis laser gyrometer, inside a hollow cylindrical jacket by means of two fastening rings that are coaxial with the actuation axis of the gyrometer unit. As in the above case of a single-axis gyrometer, these rings have a certain degree of flexibility in rotational torsion. They are fixed by their hub or inner periphery to the triaxial laser gyrometer unit and by their rim or outer periphery to the hollow cylindrical jacket which in its turn is fixed in a casing by means of several elastic shock absorbers evenly distributed on its rim. One of the fastening rings is provided with a piezoelectric oscillatory motor used to generate and sustain the actuating oscillations.

When a single-axis or triaxial laser gyrometer is subjected to mechanical actuating oscillations, it is necessary to determine the proportional share of these actuating oscillations in the measurement or measurements of rotational speeds delivered so as to eliminate this share and keep only that part which corresponds to the measurements of the true rotational speeds of rotation of the carrier of the gyrometer. To achieve this and also to adjust the excitation of the piezoelectric motor, it is useful to know the effective amplitude of the actuating vibrations. This is done in a known way by fitting out the motor-driven ring with an actuating motion detector.

The fastening rings of a mechanically actuated gyrometer usually have the form of a spoked wheel with a hub held in the center of a rim by flexible radial strips, positioned in transversal planes and evenly distributed around the hub, that act as springs.

The piezoelectric motor consists of piezoelectric ceramic plates provided on their sides with excitation electrodes and bonded to several radial strips that fixedly join the hub to the rim of the motor-driven, fastening ring. These piezoelectric plates, when excited appropriately by a voltage, give rise to a bimetallic effect on the radial strips. This bimetallic effect, when it is repetitive, causes rotational oscillations between the hub and the rim of the motor-driven fastening ring.

The actuating motion detector commonly used consists of a torsion detector consisting of a single piezoelectric plate cross-polarized polarized by a remanent magnetic field, coated on its sides with two electrodes and bonded to one of the radial strips of the motor-driven fastening ring that has no driving piezoelectric plates. The piezoelectric plate of the torsion detector is not excited electrically and, between its electrodes, it gives electrical charges like a capacitor. The number and polarization of these electrical charges are a function of the deformations undergone by the radial strip that carries the plate. The plate has the drawback of being sensitive not only to mechanical actuating vibrations but also to parasitic mechanical vibrations originating in external mechanical disturbances. Indeed, an impact or vibrations applied to the casing of the gyrometer dictate an acceleration on the suspended part of the gyrometer. This acceleration deforms the flexible strips of the fastening ring. These deformations are detected by the piezoelectric ceramic plate of the torsion detector in the same way as those due to the actuating vibrations. They are the cause of a noise in the output signal of the torsion detector which gets added to the useful component due to the actuating vibrations and is difficult to eliminate by signal processing because it occupies a very wide frequency range that overlaps the frequency range of the actuating vibrations.

SUMMARY OF THE INVENTION

It is an aim of the present invention to provide an actuating motion detector for gyrolasers that has lower sensitivity to external mechanical disturbances.

An object of the invention is an actuating motion detection device for mechanically actuated gyrolasers fitted out with at least one fastening ring that is coaxial with its actuation axis and comprises a hub held at the center of a rim by radial flexible strips positioned in transversal planes and evenly distributed about the hub, that act as springs and go into vibration under the effect of the actuating motion. This actuating motion detection device comprises several torsion detectors with piezoelectric plates polarized by remanent magnetic field, each coated on their sides with two electrodes that are positioned differently on the flexible strips of the fastening ring, and having their electrodes parallel-connected or antiparallel-connected to a common output so that, in response to deformations of the strips due to rotational motions along the actuation axis, they generate electrical charges with the same polarity that collect at the common output and, in response to deformations of the strips coming from other motions, they generate electrical charges with opposite polarities that cancel each other out at the common output so as to favor the response to the deformations due to rotational motion along the actuation axis over the response to any other deformation.

Advantageously, the actuating motion detection device has at least one pair of torsion detectors with piezoelectric plates polarized by remanent magnetic field, coated on their sides with two electrodes that are positioned so as to face each other on one and the same flexible strip of the fastening ring with their remanent magnetic fields in opposite directions and their electrodes in antiparallel connection to the common output.

Advantageously, the actuating motion detection device has several torsion detectors with piezoelectric plates polarized by remanent magnetic field each coated on their sides with two electrodes, these torsion detectors being distributed on the flexible strips of the fastening ring in accordance with a symmetry of revolution with respect to the actuation axis and having their electrodes parallel-connected to the common output.

Advantageously, the actuating motion detection device comprises several pairs of torsion detectors with piezoelectric plates polarized by remanent magnetic field, coated on their sides with two electrodes, each pair of torsion detectors having their two piezoelectric plates positioned so as to face each other on one and the same flexible strip of the fastening ring with their electrodes antiparallel-connected to intermediate output terminals and the different pairs of torsion detectors being distributed on the flexible strips of the fastening ring in accordance with a symmetry of revolution with respect to the actuation axis and having their intermediate output terminals in parallel connection.

BRIEF DESCRIPTION OF DRAWINGS

Other features and advantages of the invention shall appear from the following description of an embodiment given by way of an example. This description is made with reference to the drawings, of which.

DESCRIPTION OF THE PREFERRED EMBODIMENT

A laser gyrometer takes the form of an optical unit having one or more resonant optical cavities (one per axis of detection). This optical unit is placed in a cylindrical jacket having the same axis as its mechanical actuation axis. It is fixed into this jacket, which acts as a chassis, by means of two flexible fastening rings, flexible in rotational torsion, that permit the oscillatory rotational actuating motion. These two fastening rings are mounted on either side of the optical unit of the laser gyrometer coaxially with its mechanical actuation axis. They are attached by their hub or inner periphery to the optical unit of the laser gyrometer and by their rim or outer periphery to the cylindrical jacket.

Figure 1:
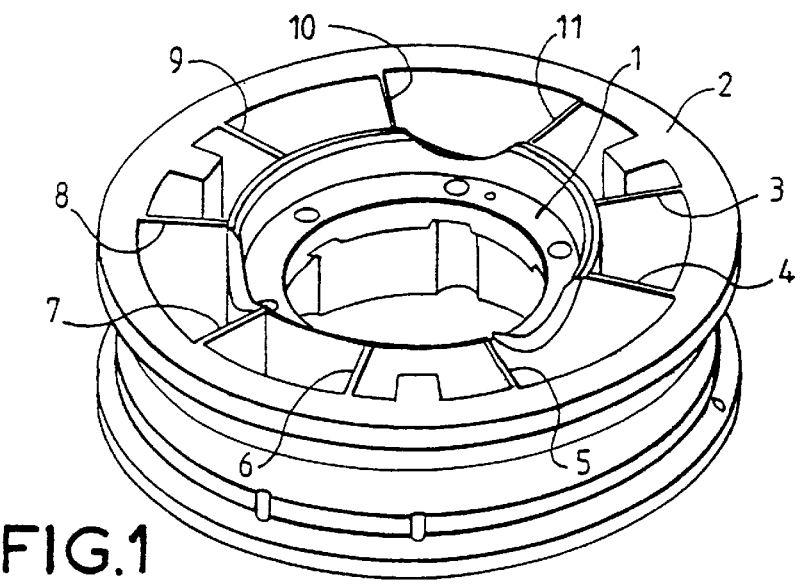
FIG. 1 gives a view in perspective of a fastening ring for laser gyrometers designed to allow and, as the case may be, cause rotational oscillations of an actuating motion, FIGS. 2, 3 and 4 give a schematic view of the different deformations that can be undergone by a flexible strip of a fastening ring such as the one shown in FIG. 1, under the effect of an external mechanical disturbance transmitted by the carrier of the laser gyrometer, FIG. 5 gives a schematic illustration of a first embodiment of the invention in which a pair of piezoelectric plates polarized by remanent magnetic field, coated on their sides with two electrodes are positioned so as to face each other on a flexible strip of a fastening ring as shown in FIG. 1, with their electrodes antiparallel-connected to a common output, and FIG. 6 gives an illustration, which is also schematic, of a second embodiment of the invention that can be combined with the first, in which several piezoelectric plates polarized by remanent magnetic field, coated on their sides with two electrodes, are distributed on the flexible strips of a fastening ring such as the one shown in FIG. 1 in accordance with a symmetry of revolution, their electrodes being parallel-connected to a common output.

Each fastening ring, designed to have a certain flexibility in rotational torsion, usually takes the form of a spoked wheel, the flexibility in rotational torsion coming from the elasticity of the spokes. An exemplary fastening ring for a laser gyrometer is shown in FIG. 1. It has two rigid parts: a hub 1 held at the center of a rim 2 by means of radial strips 3 to 11 positioned in radial transversal planes and evenly distributed around the hub 1. Owing to their thinness, the radial strips 3 to 11 have a certain flexibility that makes it possible for the hub 1 to undergo rotational oscillations with respect to the rim 2.

One of the fastening rings is provided with a piezoelectric motor used to generate and sustain an oscillatory rotational motion of its hub with respect to its rim which constitutes the actuating of the laser gyrometer. This piezoelectric motor consists of one or more piezoelectric ceramic plates coated on each of their sides with excitation electrodes. Each piezoelectric plate of the motor is bonded to a strip so that, when it is excited by a transversal electrical field due to the application of an electrical excitation between its electrodes, by bimetallic effect, it causes a torsion of the strip in the plane of the ring. The motor has piezoelectric plates not on all the strips but on only one or more of them evenly distributed around the hub, for example six piezoelectric plates placed on the strips 4, 5, 7, 8, 10 and 11.

To take account, in the laser gyrometer measurement signal, of the portion due to the mechanical actuation, it is necessary to have precise knowledge of the amplitude and frequency of the rotational oscillations to which it is actually subjected. Now these quantities are not constant and depend on ambient conditions, especially temperature, so that it is necessary to measure these oscillations. This measurement also has the advantage of enabling a regulation of the actuating motion by feedback on the electrical excitation given to the pairs of piezoelectric plates of the motor in order to keep the laser gyrometer in conditions where it shows its highest sensitivity.

To measure the oscillatory actuating motion effectively conveyed to a laser gyrometer, the motor-driven fastening ring is fitted out with a motion detector. This motion detector has hitherto consisted of a simple piezoelectric plate cross-polarized by a remanent magnetic field and coated on its sides with two electrodes bonded to one of the flexible radial strips of the motor-driven fastening ring that has no pair of driving piezoelectric plates and is used as a torsion sensor.

The piezoelectric plate of the torsion sensor is not electrically excited and, between its electrodes, it gives the electrical charges like a capacitor. The number of these charges and their polarization are a function of the deformations undergone by the radial strip that bears the plate.

A motion detector of this kind has the drawback of being sensitive to all the deformations of the strip that it is fitted to whether these deformations are prompted by the oscillatory actuating motion or whether they arise out of parasitic mechanical vibrations due to external mechanical disturbances. Indeed, an impact or vibrations applied to the casing of the gyrometer imposes an acceleration on the suspended part of the gyrometer. This acceleration deforms the flexible strip of the fastening ring. These deformations are detected by the piezoelectric ceramic plate polarized by remanent magnetic field of the torsion sensor of the motion detector, whether or not they participate in the rotational oscillatory actuating motion. When they do not participate in the actuating motion, they cause a noise in the output signal of the motion detector that is added to the useful component due to actuating vibrations. This noise is difficult to eliminate by signal processing because it occupies a wide frequency range overlapping the frequency range of the actuating vibrations.

It is proposed to make the motion detector more sensitive to the actuating oscillations than to any other motion of the suspended part of a laser gyrometer by constituting it by means of several torsion sensors which are positioned differently on the flexible radial strips of a fastening ring and whose electrodes are parallel-connected or antiparallel-connected to a common output so that, in response to deformations of the strips due to rotational motions along the actuation axis, they generate electrical charges of the same polarity that accumulate at the common output and, in response to deformations of the strips coming from other motions, they generate electrical charges of opposite polarities that cancel each other out on the common output. This composition favors the response of the motion detector to deformations due to rotational motions along the actuation axis by the accumulation of the partial responses from its different torsion sensors while, at the same time, lessening its response to any other deformation by compensation between the partial responses of its different voltage sensors.

The external mechanical disturbances can cause noise in the measurement of the actuating oscillations only when they cause deformations in the radial strips different from those caused by the oscillatory actuating motion. Since the deformations caused in the radial strips of a fastening ring by the oscillatory actuating motion are exclusively lateral flexion deformations that are identical and have the same direction for all the radial strips, the only mechanical disturbances that are troublesome for the measurement of the actuating oscillations are those that give rise, in the radial strips, either to deformations in their plane, in the longitudinal direction as shown in FIG. 2, or in the vertical direction as shown in FIG. 3, or transversal deformations as shown in FIG. 4.

Figure 2:
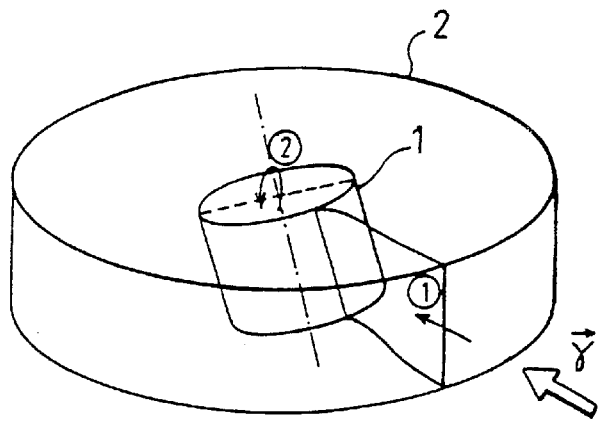

FIG. 2 gives a schematic view of the effect, on a fastening ring, of a mechanical disturbance in a radial direction along the plane of a flexible strip. The mechanical disturbance is identified by an acceleration vector γ placed in the plane of the flexible strip, outside the fastening ring and oriented perpendicularly to the actuation axis. It gives rise to a traction/compression ① of the flexible strip with flexion ② in its plane. This effect leads to an off-centering of the hub in the radial direction of the flexible strip along with an off-axis shift.

Figure 3:
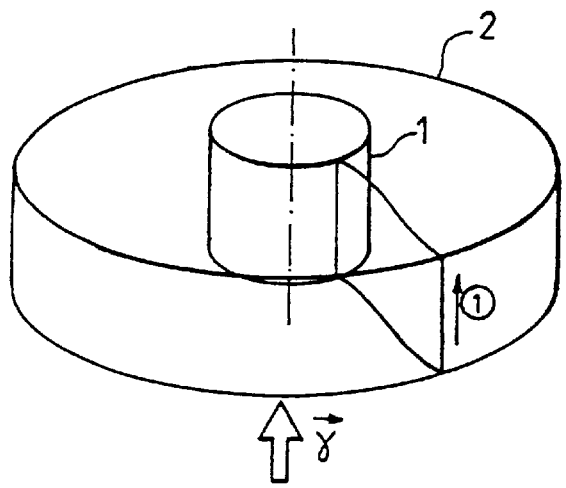

FIG. 3 gives a schematic view of the effect, on a fastening ring, of a mechanical disturbance towards the actuation axis. The mechanical disturbance is identified by an acceleration vector γ placed on the exterior of the flexible ring along its axis. It gives rise to effects of flexion and shearing ① of the flexible strips with a shift of the hub that undergoes a translation along the actuation axis towards the exterior of the flexible ring.

Figure 4:
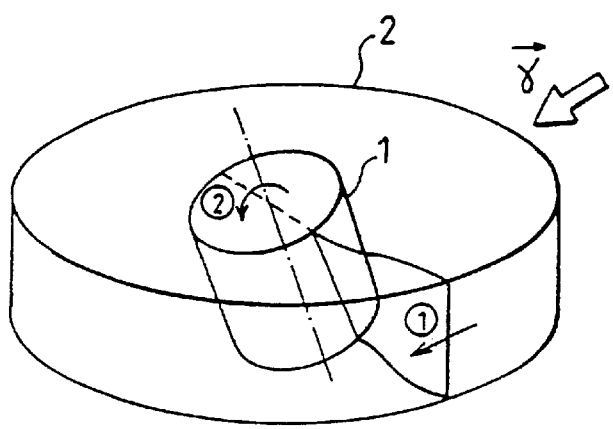

FIG. 4 gives a schematic view of the effect, on a fastening ring, of a mechanical disturbance in the radial direction, along the normal to the plane of a flexible strip. The mechanical disturbance is identified by an acceleration vector γ placed outside the fastening ring, along the normal to a flexible strip. It gives rise to a flexion of the flexible strip ① with torsion ② in a plane perpendicular to this flexible strop. This effect leads to an off-centering of the hub in a normal direction along with an off-axis shift.

In an actuating motion detector, the detection of lateral flexion deformations of the same amplitude affecting all the radial strips must be favored over all the other possible deformations of radial strips that have just been reviewed with reference to FIGS. 2 to 4.

Figure 5:
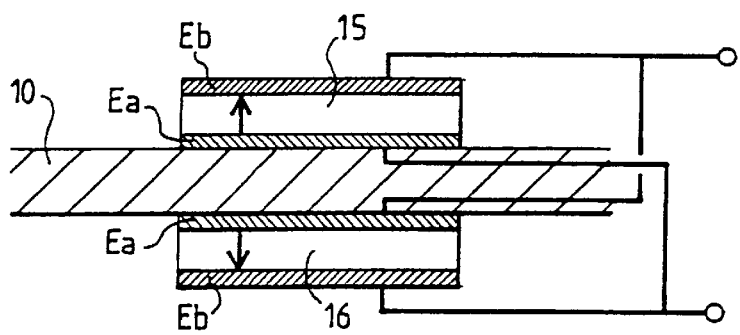

FIG. 5 shows a first exemplary actuating motion detector that gives preference to the detection of same-amplitude lateral flexion deformations affecting all the radial strips rather than the deformations of the radial strips in their plane, in both the longitudinal and the vertical directions. This actuating motion detector is built out of a pair of piezoelectric torsion sensors 15 and 16 bonded on either side of one and the same flexible radial strip of a fastening ring. Each torsion sensor 15, 16 consists of a piezoelectric plate cross-polarized by a remanent magnetic field and coated on its sides with two electrodes $E_a$, $E_b$ differentiated by the direction of the remanent magnetic field, the electrode $E_a$ being positioned on the up-line side and the electrode $E_b$ being positioned on the down-line side with reference to the remanent magnetic field. The two piezoelectric sensors are bonded by their same-nature electrodes, $E_a$ in the case shown, but it could also be $E_b$, to the opposite faces of one and the same flexible radial strip of a fastening ring, preferably the motor-driven strip. Their electrodes are antiparallel-connected, the electrode $E_a$ of one of them being connected to the electrode $E_b$ of the other and vice versa.

With this arrangement, the motion detector remains sensitive to flexions of the radial strip, in the plane of the fastening ring, that correspond to the oscillatory actuating motion. Indeed, during flexions of this kind, one of the piezoelectric plates is subjected to a longitudinal mechanical compressive stress while the other is subjected to a longitudinal tensile stress. Under the effect of these two opposite longitudinal stresses, the piezoelectric plates generate electrical charges with opposite signs. However, since their electrodes are antiparallel-connected, these charges collect at output of the motion detector. However, for the deformations of the radial strip in its plane, whether in the longitudinal direction as shown in FIG. 2 or in the vertical direction as shown in FIG. 3, the two piezoelectric plates are subjected to identical tensile or compressive longitudinal stresses and generate same-sign electrical charges that cancel each other out because of the antiparallel connection.

This assembly gives a motion detector that is always sensitive to the rotational oscillations about the actuation axis of the laser gyrometer but with far smaller sensitivity to the parasitic motions giving rise to deformations, in its plane, of the radial strip that supports it. It is therefore appreciably less affected by the external mechanical disturbances than the prior art motion detectors described here above. However, it always has a certain residual sensitivity to external mechanical disturbances owing to the fact that it always reacts to the transversal deformations of the strip that supports it even when these disturbances do not come from rotational actuating oscillations.

Figure 6:
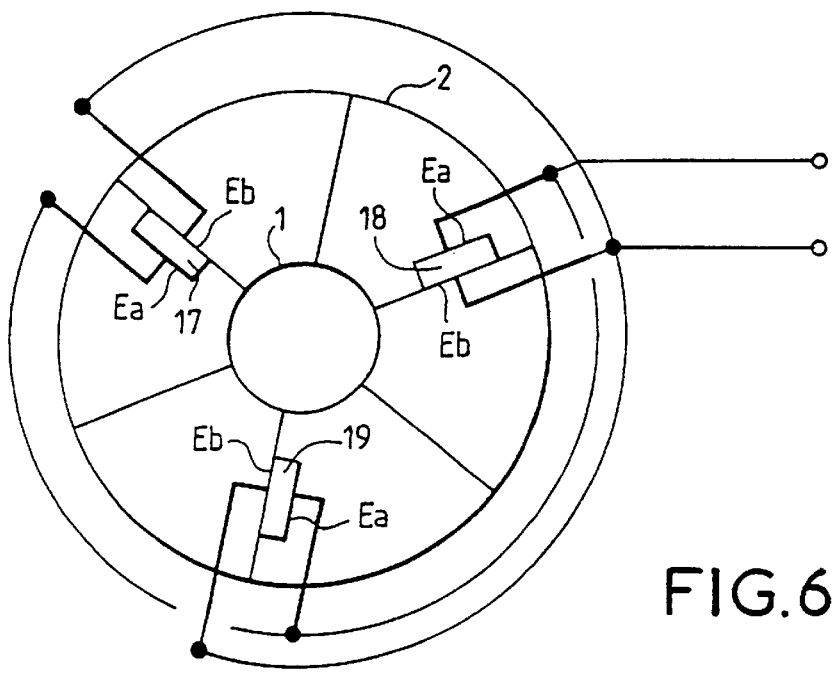

FIG. 6 gives a second example of an actuating motion detector that gives preference to the detection of the same-amplitude lateral flexion deformations affecting all the radial strips rather than the transversal deformations of the radial strips. This actuating motion detector is built out of several piezoelectric torsion sensors 17, 18, 19 that are distributed on the flexible radial strips of a fastening ring in accordance with a symmetry of revolution about their axis that is the same as the actuation axis. As above, each piezoelectric torsion sensor 17, 18, 19 consists of a piezoelectric plate cross-polarized by a remanent magnetic field and coated on its sides with two electrodes $E_a$, $E_b$ differentiated by the direction of the remanent magnetic field. Here the different piezoelectric plates of the torsion sensors are bonded by one and the same face to one and the same face of the different radial strips of one and the same fastening ring of a laser gyrometer with their same-type electrodes $E_a$ or $E_b$ attached together to one and the same output terminal of the motion detector.

With this arrangement, the motion detector remains sensitive to the flexions of the radial strip, in the plane of the fastening ring, that correspond to the oscillatory actuating motion. Indeed, when there is a flexion of this kind, the different piezoelectric plates are subjected to mechanical stresses of the same type, tensile or compressive, and generate same-sign electrical charges that get added together at output of the motion detector owing to the parallel connection of their electrodes of the same type. However, the motion detector is insensitive to a motion causing a deformation of a radial strip transversal to its plane because then the torsion sensor fitted to this radial strip is not excited owing to the absence of torsion whereas the torsion sensors positioned on the other two radial strips placed at 120° are excited in opposite directions, one perceiving a longitudinal compressive stress and the other a longitudinal tensile stress and their contributions get cancelled out in the signal of the motion detector because of their parallel connection.

This assembly gives a motion detector that is always sensitive to the rotational oscillations around the actuation axis of the laser gyrometer but with far lower sensitivity to the parasitic motions causing transversal deformations of the radial strips. It is therefore less affected by external mechanical disturbances than the prior art motion detectors described here above. However, it always shows a certain residual sensitivity to external mechanical disturbances because it always reacts to the deformations of the radial strips in their plane whereas these cannot come from actuation rotation oscillations.

A combination of the two actuating motion detectors proposed with reference to FIGS. 5 and 6 overcomes the defects of both these approaches, and makes it possible to obtain an actuating motion detector that is particularly insensitive to external mechanical disturbances. This arrangement consists simply in distributing several actuating motion detectors according to FIG. 5 on different radial strips of a fastening ring in maintaining a symmetry of revolution with respect to the actuation axis and obtaining the parallel connection of the output terminals of these different detectors.

What is claimed is:

1. An actuating motion detection device for a mechanically actuated gyrolaser including at least one fastening ring coaxial with an actuation axis of the gyrolaser, the fastening ring including a hub held at a center of a rim by radial flexible strips distributed about the hub, the radial flexible strips configured to act as springs and to vibrate under an actuating motion, said detection device comprising:

torsion detectors including, a pair of piezoelectric plates disposed at a radial position along one of the radial flexible strips and having respective remanent magnetic fields for each piezoelectric plate aligned in opposite directions, each piezoelectric plate having two electrodes positioned on opposite sides of the piezoelectric plate with one of said two electrodes contacting said one of the radial flexible strips, and said two electrodes connected to a common output so that, in response to deformations of the radial flexible strips due to rotational motions along the actuation axis, the torsion detectors generate electrical signals of a same polarity that collect at the common output and, in response to deformations of the flexible strips coming from motions not along the actuation axis, the torsion detectors generate electrical signals of opposite polarities that cancel one another at the common output.

2. Device according to claim 1, wherein for at least one pair of torsion detectors the two electrodes of said piezoelectric plates are connected in an antiparallel connection to the common output.

3. Device according to claim 1, wherein multiple piezoelectric plates are distributed on a same side of different radial flexible strips in accordance with a symmetry of revolution with respect to the actuation axis and the multiple piezoelectric plates have electrodes parallel-connected to the common output.

4. Device according to claim 1, wherein the torsion detectors comprise:

a first pair of said piezoelectric plates having electrodes of said first pair antiparallel-connected to intermediate output terminals; and a set of multiple piezoelectric plates distributed on a same side of the radial flexible strips in accordance with a symmetry of revolution with respect to the actuation axis and having electrodes of each of said multiple piezoelectric plates parallel connected to the intermediate output terminals.

5. An actuating motion detection device for a mechanically actuated gyrolaser including at least one fastening ring coaxial with an actuation axis of the gyrolaser, the fastening ring including a hub held at a center of a rim by radial flexible strips distributed about the hub, the radial flexible strips configured to act as springs and to vibrate under an actuating motion, said detection device comprising:

torsion detectors including multiple piezoelectric plates distributed on a same side of different radial flexible strips in accordance with a symmetry of revolution with respect to the actuation axis, the multiple piezoelectric plates having electrodes parallel-connected to the common output.

* * * * *

UNITED STATES PATENT AND TRADEMARK OFFICE
CERTIFICATE OF CORRECTION

PATENT NO. : 6,498,651 B1
DATED : December 24, 2002
INVENTOR(S) : Loil

It is certified that error appears in the above-identified patent and that said Letters Patent is hereby corrected as shown below:

<u>Title page, Item [54] and Column 1, lines 1 and 2,</u>
Should read:

-- ACTUATING MOTION DETECTION DEVICE FOR DETECTING ROTATIONAL MOTION OF GYROLASERS --

Item [22], the PCT filing date should read:

-- [22] PCT Filed: Feb. 18, 2000 --

Signed and Sealed this

Twentieth Day of May, 2003

JAMES E. ROGAN
*Director of the United States Patent and Trademark Office*